United States Patent
Ortiz et al.

(10) Patent No.: US 11,110,550 B2
(45) Date of Patent: Sep. 7, 2021

(54) METALS PROCESSING SYSTEM IN 2D AND 3D WITH OPTIC FIBER LASER AND PLASMA

(71) Applicant: LASER TECH, S.A. de C.V., Aguascalientes (MX)

(72) Inventors: Sofia Elizabeth Acosta Ortiz, Aguascalientes (MX); Jose Alberto Arellano Acosta, Queretaro (MX)

(73) Assignee: LASER TECH, S.A. DE C.V., Aguascalientes (MX)

( * ) Notice: Subject to any disclaimer, the term of this patent is extended or adjusted under 35 U.S.C. 154(b) by 305 days.

(21) Appl. No.: 15/359,256

(22) Filed: Nov. 22, 2016

(65) Prior Publication Data
US 2017/0151633 A1    Jun. 1, 2017

(30) Foreign Application Priority Data
Nov. 27, 2015    (MX) .................... MX/a/2015/017093

(51) Int. Cl.
*B23K 10/00*    (2006.01)
*B23K 28/02*    (2014.01)
(Continued)

(52) U.S. Cl.
CPC .............. *B23K 28/02* (2013.01); *B23K 10/00* (2013.01); *B23K 26/21* (2015.10); *B23K 26/38* (2013.01); *B25J 11/0055* (2013.01); *B25J 15/0019* (2013.01); *B25J 19/06* (2013.01); *G05B 19/4145* (2013.01); *B23K 2101/06* (2018.08); *B23K 2101/18* (2018.08); *G05B 2219/36199* (2013.01); *G05B 2219/45104* (2013.01); *G05B 2219/45138* (2013.01)

(58) Field of Classification Search
CPC ........ B23K 28/02; B23K 26/21; B23K 10/00; B23K 26/38; B23K 2201/18; B23K 2001/06; B23K 2214/45138; B23K 2219/45; B23K 2219/104; B25J 11/0055; B25J 15/0019; B25J 19/06; H05H 1/26; H05H 1/36
USPC ............ 219/121.39, 121.45, 121.46, 121.56, 219/121.63, 121.67, 121.54
See application file for complete search history.

(56) References Cited

U.S. PATENT DOCUMENTS 8,933,366 B2 *    1/2015    Patten ................ B23K 26/0093
                                                      219/121.66
9,008,820 B2 *    4/2015    Habermann ............ B24C 1/045
                                                      451/5
(Continued)

*Primary Examiner* — Mark H Paschall
(74) *Attorney, Agent, or Firm* — Hogan Lovells US LLP

(57) ABSTRACT

System for 2D and 3D metal processing with fiber optic laser and plasma, that includes CNC for cutting metal plates with fiber optic laser and plasma and a robot arm for cutting and welding metals with fiber optic laser. The system is characterized because it includes three processes in one single equipment: metal cutting with fiber optic laser, metal cutting with plasma and metal welding with fiber optic laser. The equipment has a computer numerical control (CNC) system and a working area of 1200×3000 mm for cutting metals; it has two cutting heads, one for fiber optic laser and one for plasma as well as one 360° rotating robot arm on which the laser welding head or the laser cutting head can be placed for 3D welding, or cutting circular or rectangular pipes, respectively.

7 Claims, 1 Drawing Sheet

(51) Int. Cl.
*B23K 26/21* (2014.01)
*B23K 26/38* (2014.01)
*B25J 11/00* (2006.01)
*B25J 15/00* (2006.01)
*B25J 19/06* (2006.01)
*G05B 19/414* (2006.01)
*B23K 101/06* (2006.01)
*B23K 101/18* (2006.01)

(56) References Cited

U.S. PATENT DOCUMENTS

| | | | | |
|---|---|---|---|---|
| 9,877,805 | B2 * | 1/2018 | Abels | B28B 11/12 |
| 10,195,683 | B2 * | 2/2019 | Fagan | B23K 10/006 |
| 2003/0204283 | A1 * | 10/2003 | Picard | B23K 10/00 |
| | | | | 700/166 |
| 2012/0205360 | A1 * | 8/2012 | Fitzpatrick | B23B 41/003 |
| | | | | 219/137 R |
| 2014/0343567 | A1 * | 11/2014 | Morash | A61B 17/16 |
| | | | | 606/130 |
| 2016/0139587 | A1 * | 5/2016 | Jarvis | G05B 19/402 |
| | | | | 700/186 |

* cited by examiner

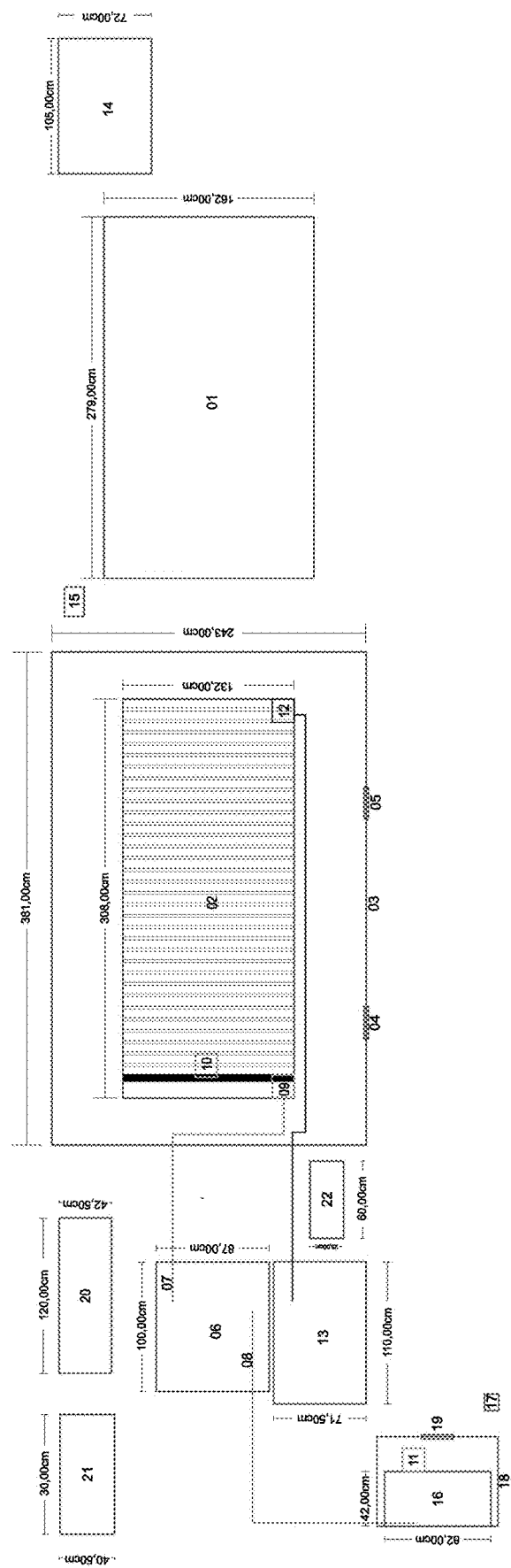

METALS PROCESSING SYSTEM IN 2D AND 3D WITH OPTIC FIBER LASER AND PLASMA

TECHNICAL FIELD

Electronic machinery for the metal-mechanical industry, specifically, machines for cutting and welding metals. The equipment permits to cut carbon steel metal plates of up to 120×300 cm and up to 5 cm thick; stainless steel and aluminum metal plates (up to 3.8 cm thick), using a fiber laser and a high power plasma. It also permits to cut and weld 3D metals using the same fiber laser and a robot.

BACKGROUND

Currently, laser metal cutting is one of the most common laser industrial applications. In Japan, about 80% of the industrial lasers are used for this purpose. The main reason is that laser cutting can substitute other processes because it permits to make quicker and better quality cuts than other metal cutting processes (Steen and Mazumder, 2010). The advantages of laser cutting can be divided in two categories: cutting quality and process characteristics.

Cutting Quality:
Very thin cutting widths are possible, resulting in important material saving.
The cutting edge can be straight and not rounded as is the case with other cutting processes or techniques.
Smooth and clean cutting edge, not requiring other cleaning treatments or processes.
The cutting edge is sufficiently clean so that the piece can be directly welded.
Laser cutting does not generate burr, contrary with to other mechanical cutting techniques.
Generally, there is a very thin re-solidification layer, in the order of a few micrometers, and so distortion is negligible.
The only disadvantage is that the cutting depth is limited and depends on the laser power. The actual cutting depths vary from 10 to 20 mm in the case of stainless steel, with laser powers ranging from 2 to 5 kilowatts.

Process Characteristics:
Laser cutting is one of fastest cutting processes.
There is no need to fasten the piece to be cut.
No other tools are used because the cutting process is a non-contact process, but the focus lens must be kept clean.
Cuts can be made in any direction.
Very low noise level.
The process can be easily automated.
The requested changes are mainly "soft", i.e., are basically changes in the laser parameter programming or in the design, and thus the process is very flexible.
Some materials can be cut in various layers.
Nearly all materials can be cut, either fragile, electrically conductive or non-conductive, hard or soft. Only highly reflective materials such as aluminum, copper and gold may sometimes generate problems, but they can be satisfactorily cut with an appropriate control of the laser parameters.

As of today, various lasers systems have been developed for cutting metals, mainly carbon dioxide laser ($CO_2$), the most commonly used for cutting metals. However, these systems need a great deal of maintenance: the $CO_2$ cutting systems need the presence of several mirrors to guide the laser beam to the position were cutting is requested and these mirrors have to be perfectly aligned so that laser power is not lost. These mirrors are frequently out of alignment because of their continuous use and thus production has to be stopped to align them. Moreover, after a given number of hours of use, the mirrors become dirty and have to be cleaned, and the reflective cover of the mirror becomes damaged and has to be replaced. For these reasons, the maintenance costs of these equipments are very high.

Recently, fiber lasers have found increasing applications in the industry and particularly in metal cutting, because of the following advantages compared to $CO_2$ lasers:
The same fiber optic produces the laser radiation and so the laser output enters directly in the cutting head, eliminating thus energy losses.
There is no need for mirrors to guide the laser beam to the cutting head and this eliminates the maintenance of these mirrors (cleaning, replacement because of damage caused to the reflective film, alignment) and thus the expense associated with the maintenance and the production downtimes to maintain the equipment are eliminated.
Compared to a $CO_2$ laser, less power is required for cutting a given metal thickness at a higher speed.
A lower cutting pressure of the assist gas is required and thus the related expenses are eliminated.
It permits to cut metals that normally are not cut with $CO_2$, such as brass, copper and titanium.

Plasma metal cutting is a technique that has been used for many years and permits to cut thicker metal plates than laser, although with a lower cutting quality.

Plasma metal cutting is a process in which an inert gas is blown at high speed through a nozzle, at the same time, an electric arc is formed through the nozzle which makes it possible for the gas to pass to the fourth state of matter, plasma. The plasma is sufficiently hot to melt the metal, cutting it. For this purpose, the requirements are as follows: a high-frequency generator to supply electrical energy, a gas (argon, hydrogen, nitrogen) to generate the heating flame, an electrode holder and an electrode that can be made of tungsten, hafnium or zirconium, depending on the gas used. Plasma cutting has a wider spectrum of application on materials than flame cutting and the cutting speed is up to 6 times greater, depending on the material gauge.

On the other hand, laser welding is becoming increasingly popular because of its finishing quality and because the heating is done on a much smaller surface compared to traditional welding systems. Laser systems for welding purposes can be used for filling porosities, filling damaged surfaces, spreading an alloy droplet along a complex edge and correct manufacturing defects. Laser welding reorders the molecular structure of similar or different metals at the welding point, permitting that two common alloys become a single one.

DETAILED DESCRIPTION

The invention relates to the design and construction of a piece of equipment that permits to perform three processes in one single machine: metal plate and pipe cutting with fiber laser, metal plate cutting with plasma and laser metal welding. Thus, with one single piece of equipment, metal plates up to 20 mm thick can be cut with a very smooth finishing (with fiber optic laser), metal plates up to 50 mm thick can be cut with plasma with a coarser finishing, circular or rectangular pipes can be cut with fiber optic laser and metal pieces can be welded with fiber optic laser with a very smooth finishing. The equipment includes a high-precision computer-controlled coordinate table (high-precision CNC) (02); a fiber optic laser source (06) with two fiber optics, one for cutting purposes (07) and the other for welding purposes (08), one or the other being selected to use the whole laser power which can range from 1000 to 6000 W; one of the fibers is inserted in a laser cutting head (09) which is mounted on the high-precision CNC; and the other is inserted in the laser welding head (11) that is mounted on a robot (16) for three-dimensional welding; and a plasma source for cutting very thick metals, which has a head (12) that is also mounted on the CNC. Switching between the laser cutting head and the plasma cutting head is very simple and can be effected in one single movement (Registration of the License of Use and Exploitation in favor of LASER TECH S.A. DE C.V. according to IMPI official action No. MX/2015/39136. Application for Normal Utility Model MX/U/2014/000181 in the name of Corporación Mexicana de Investigación en Materiales, S.A. of C.V.). The equipment includes a protection cabinet for the operator in the CNC (03), a computer for controlling laser parameters (21), a CNC control system (22), a laser self-focusing system, a laser cooling system (14), a smoke extraction system for environmental contamination prevention (15) and a robot arm (16) for placing the fiber laser welding head or the fiber laser cutting head with when 3D cutting is requested (for example, to cut circular or rectangular pipes).

DESCRIPTION OF THE DRAWINGS

FIG. 1 shows the chart of the metal processing system. (01) is the loading table on which the cutting table (02) slides to position the metal plate to be cut. Once the metal plate is placed on the cutting table, said table is slid toward the inner part of the system which is protected by a safety cabinet (03) having two viewing windows (04 and 05) equipped with special protection filter permitting to look inside without damaging the eyes. The system has a 3000 W fiber optic laser, but its power can range from 1000 W to 6000 W. The laser source (06) has two fiber optics, one for cutting metals (07) and the other for welding metals (08). The laser fiber for cutting metals is inserted in the cutting laser head (09) which is placed on the Z-axis (10) for laser cutting purposes. This head has a self-focusing system to maintain the laser focused although the metal plate may not perfectly planar. The laser fiber for welding purposes is placed on the laser welding head (11). The laser source has a switch permitting to select either the cutting fiber or the welding fiber and to send the whole laser power there. For plasma cutting purposes, the cutting laser head is removed from the Z-axis and the plasma head (12) is placed on the Z-axis, the laser source (06) is turned off and the plasma source (13) is turned on. The laser cutting system has a cooling system (chiller) (14) based on both distilled and plain waters. The complete system has a filter extractor (15) absorbing the few particles generated during the cutting process and preventing the contamination of the environment. For laser welding purposes, the laser source (06) is turned on, the welding laser fiber is selected, which is inserted in the special head for laser welding (11), which is, in turn, inserted in the robot arm (16), which is controlled through a portable control unit (17). The robot arm has a protection cabinet for the operator (18) with a window having a special filter for the laser wavelength (19) permitting to look inside without damaging the eyes. For 3-D metal cutting purposes, the fiber laser cutting head (09) is inserted in the robot arm (16). Moreover, the FIGURE shows the CNC control cabinet (20), the computer for laser parameter control (21) and the CNC control (22).

The invention is most beneficial in industrial applications where metals have to be automatically, safely and quickly cut or welded, because the equipment includes safety cabinets and safety controls to prevent accidents.

The equipment can be used for cutting metal plates made of commercial steel, stainless steel, aluminum, brass, copper, titanium, etc. The industries requiring the cutting of metal plates and metal pipes include, among others, automotive and auto parts, metal-mechanical, electronics, manufacturing, home appliances, etc. The equipment permits to cut medium thicknesses (up to 20 mm thick commercial steel pieces) with laser, and greater thicknesses (up to 50 mm thick commercial steel pieces) with plasma, using the same CNC and changing only the cutting head in a very simple way. It permits to cut circular or rectangular pipes with fiber optic laser with the support of a robot arm.

The equipment can also be used for welding metals and plastics with fiber optic laser. The same fiber laser source has two fibers, one for cutting and the other for welding purposes. The equipment includes a robot to permit three-dimensional welding. Metal and plastic welding is used in the following industries: automotive and auto parts, electronics, metal-mechanical, manufacturing, home appliances, etc.

The thickness of the plate that can be cut depends on the power of the fiber laser installed in the equipment. Table 1 indicates the metal plate thicknesses that can be cut with fiber optic laser and plasma when a 3000 W fiber optic laser is used.

TABLE 1

Maximum metal plate thicknesses that can be cut with a 3000 W fiber optic laser.

| MATERIAL | 3000 W FIBER LASER | PLASMA |
| --- | --- | --- |
| Commercial steel | 20 mm | 50 mm |
| Stainless steel | 12 mm | 38 mm |
| Aluminum | 10 mm | 38 mm |
| Brass | 10 mm | |
| Copper | 6 mm | |
| Titanium | 5 mm | |

REFERENCES

W. M. Steen and J. Mazumder. "Laser Material Processing" Fourth Edition. Springer-Verlag London Limited 2010.

The invention claimed is:

1. A system for two-dimensional (2D) and three-dimensional (3D) metal processing, comprising:
   a laser fiber optic source comprising at least two laser fiber optics;
   a switch adapted to direct power, from a laser power supply, to one of the at least two laser fiber optics, the laser power supply providing operational energy between 1000 W and 6000 W;
   a loading table;
   a high precision coordinating table that serves as a cutting table, the high precision coordinating table being axially movable relative to the loading table;
   a computer for controlling operating parameters of the at least two laser fiber optics;
   a laser cutting head, the laser cutting head receiving and supporting a first laser fiber optic of the at least two laser fiber optics;

an autofocus system for the laser cutting head;

a laser welding head, the laser welding head receiving and support a second laser fiber optic of the at least two laser fiber optics;

a plasma source having a plasma cutting head mounted on the high precision coordinating table;

a cooling system adapted for use with one or more of the laser cutting head and the laser welding head;

a protection cabinet, positioned to at least partially surrounding the high precision coordinating table;

two or more windows, formed in the protection cabinet, and covered, at least partially, by respective filter elements selected to protect operator eyesight while observing a process within the protection cabinet;

a fume extraction system, associated with the protection cabinet;

a 360°-moving robot arm; and a computer numerical control (CNC) system that controls the high precision coordinating table.

2. The system of claim 1, wherein the laser cutting head is mounted on the coordinating table, the plasma cutting head is mounted on the coordinating table, and the laser welding head is mounted on the robot arm.

3. The system of claim 1, wherein the laser cutting head is mounted on the robot arm, the plasma cutting head is mounted on the coordinating table, and the laser welding head is mounted on the coordinating table.

4. The system of claim 1, wherein only one of the at least two laser fiber optics is operable over a period of time.

5. The system of claim 4, wherein the one operable fiber optic receives a full power level from the laser power supply.

6. The system of claim 4, further comprising:

a robot arm protection cabinet, the robot arm protection cabinet at least partially enclosing the robot arm.

7. The system of claim 6, further comprising:

one or more windows, formed in the robot arm protection cabinet, and covered, at least partially, by a second filter element selected to protect operator eyesight while observing a process within the robot arm protection cabinet.

* * * * *